Patented May 4, 1954

2,677,681

UNITED STATES PATENT OFFICE 2,677,681

DERIVATIVES OF ETHYLENE IMINE

Ronald Gill, Eccleshill, Bradford, England, assignor to Allied Colloids (Manufacturing) Company Limited, Bradford, England, a British company No Drawing. Application September 30, 1952,
Serial No. 312,407

Claims priority, application Great Britain
October 6, 1951

4 Claims. (Cl. 260—239)

This invention concerns improvements in and relating to derivatives of ethylene imine.

According to one feature of the present invention new derivatives of ethylene imine are provided which contain the following grouping more than once:

I. 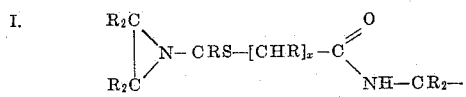

where $x$ represents 0 or 1, R represents a hydrogen atom or an alkyl group and S represents a hydrogen atom or an alkyl group or, in the case where $x=1$, a carboxylic acid group, a salt, ester, amide or anilide thereof or, in the case where $x=0$, a methocarboxylic acid group, salt, ester, amide or anilide thereof.

The preferred alkyl groups are the methyl and ethyl groups.

Among the new derivatives of ethylene imine according to the invention are those having the following general formula:

where F represents the above Grouping I, $n$ has a value between 0 and 10, X represents either $(CH_2)_a$, where $a$ is an integer from 0 to 8 inclusive, or $(CH_2NR'CH_2)_b$, where $b$ has a value between 0 and 3 inclusive and R' represents a hydrogen atom or an acyl radical such as stearyl or benzoyl and Y represents either

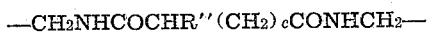

where $c$ has a value between 0 and 7 inclusive and R'' represents a hydrogen atom or, in the case where $c=1$, an ethylene imine ring attached by the nitrogen atom. The preferred compounds are those in which two of the above Groupings I are linked directly together and those in which there is the above Grouping I at either end of a molecule separated by a plurality of methylene groups which may be interrupted by imino groups.

The compounds in which S represents a carboxylic or methocarboxylic acid group or derivative thereof as defined above are derived from maleates as intermediates and in order to elucidate the main principles of the invention, the general cases will be dealt with first.

According to a further feature of the invention one method of making the novel compounds where S represents a hydrogen atom or an alkyl group comprises condensing a compound of the following general formula:

II. 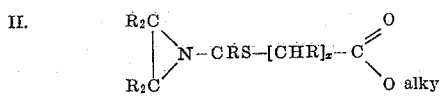

wherein R and X have the meanings given above, S represents a hydrogen atom or an alkyl group, and alkyl represents a lower alkyl radical, such as the methyl, ethyl, propyl or butyl radical, with a compound containing two or more primary aliphatic amino groups.

The condensation is preferably effected in the presence of a basic catalyst such as an alkali metal alkoxide, the most suitable being sodium methoxide or ethoxide. The preferred lower alkyl radicals are methyl and ethyl. Examples of suitable amino compounds are propylene diamine, triethylene tetramine, hexamethylene diamine and lower molecular weight polyamides having terminal primary amino groups and containing below ten —CONH— linkages. If the amine used is for example diethylene triamine which contains a secondary amino group in addition to the requisite two primary groups then the secondary group does not react with compounds of the general Formula II and the replaceable hydrogen atom of this group may be substituted by subsequent chemical reaction of the diamide of general Formula I.

In the special case where S in the general Formula I is a derivative of a carboxylic or methocarboxylic group, further variations are possible on this simple scheme. Thus, it is known that ethylene imine will add to the double bond of diethyl maleate or fumarate to give:

III. 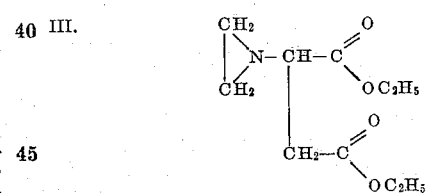

According to a further feature of the present invention, therefore, a product of the general formula IV.
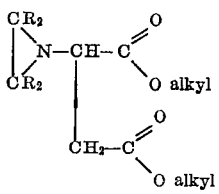

wherein R and alkyl have the meanings given above is reacted, preferably in the presence of a basic catalyst, with a compound containing two or more primary aliphatic amino groups.

Since the ester and the amino compound are bi-functional, by variation of the molecular ratio of ester to amine from 2:1 to 1:1, the molecular weight of the resultant amide will increase from a value characteristic of a relatively small molecule to a very high value characteristic of a polymer.

According to further feature of the invention compounds containing two or more groups of the general Formula I wherein S represents the amide or anilide of a carboxylic or methocarboxylic acid group may be prepared by reacting, preferably in the presence of a basic catalyst, a compound containing two or more primary aliphatic amino groups with a compound of the general Formula IV wherein one of the ester groups is replaced by an amide or anilide group.

According to a further feature of the invention compounds containing two or more groups of the general Formula I wherein S represents the carboxylic or methocarboxylic acid group or salt thereof are obtained by alkaline hydrolysis of the corresponding ester group remaining after condensation of one ester group in the compound of Formula IV with one of the amino groups in the compound containing two or more primary aliphatic amino groups.

The novel compounds of this invention are commercially attractive in that, under certain conditions, they readily polymerize. Alternatively, if compounds containing such active groups as —NH₂, —COOH or —SH or the phenolic —OH group, or such inorganic ions as halide, cyanate, bisulphite or thiosulphate are present, then the novel compounds may react with these groups or ions.

If such active groups or ions are present in compounds of high molecular weight, for example compounds having a molecular weight of not less than 10,000 various changes may be brought about in the physical and chemical properties of such compounds by reaction with small amounts, for example between ½% and 20%, usually between 5% and 10%, of the new products. For example, if the high molecular weight compound is a textile fabric such as wool, a decreased tendency to felting, an increased receptivity towards acid dyestuffs, and an increase in resistance to wear are among the advantages to be gained from application of suitable novel compounds, such as the higher molecular weight compounds derived from maleates and polyamides having less than ten —CONH— linkages.

On application to linear molecules of high molecular weight which do not contain an active group or ion such as compounds having a molecular weight of not less than 10,000, for example cellulosic or nylon fibres where the probability of reaction with the fibre is reduced, it is still found that treatment with the novel products leads to various improvements. In the case of viscose rayon increased resistance to creasing, increased dry and wet strength, high affinity for acid colours, and increased water fastness of direct colours are among the advantages to be gained. If the cellulosic fibres used are in the form of paper, such as filter paper, a considerable increase in wet strength results by treatment with a small amount, for example between ½% and 20%, usually between 5% and 10%, of the crystalline product of the Example 1 set out below and, furthermore, its increase in wet strength is not governed by any decrease in the filtration rate of the filter paper. In the case of nylon, the fabric may be given a permanent stiff handle whilst, at the same time, its affinity for acid dyestuffs is substantially increased. These advantages are substantially permanent and the novel product is not removed by any customary textile process.

If the high molecular weight compound is water-soluble, addition of the new products to an aqueous solution thereof results in ultimate insolubilisation of the compound. Thus if an aqueous solution of polymethacrylic acid containing a small amount, for example between ½% and 20%, usually between 5% and 10%, of one of the novel products is applied to a surface and the water evaporated off, it is found that the resultant film is quite water-resistant, and a solution of polyethylene imine is transformed from a viscous liquid to a rigid gel on treatment with one of the new products, and on drying out the gel and grinding, a colourless powder having good anion exchange properties is obtained. Similar ion exchange resins result from polymerisation of novel compounds of this invention.

The methods employed, on the one hand, to stabilise these new derivatives of ethylene imine and, on the other hand, to induce their polymerisation or reaction with active groups of the type quoted above are exactly the same as those in common use with ethylene imine and its simpler derivatives (see Jones, J. Org. Chem. 1944, 484). Alternatively the derivatives may be prepared in situ from the corresponding β-halo-derivatives which are well known to cyclise in aqueous solution to give the ethylene imine ring and offer a convenient means of stabilising these novel compounds by forming the hydrochloride of the β-chloro derivative and adding alkali immediately prior to use. Thus to stabilise the new compounds or their solutions, free alkali must be present, and to cause polymerisation addition of acid or acid-yielding material is required in order to give the reactive ethylene immonium ion. Variation in the degree of ionisation of the terminal ethylene imine groups brought about by varying the amount of acid added can cause appreciably different effects to be obtained. In general, when applying the compounds from an aqueous solution onto textile fibres, it is found that a stiff or boardy hande is obtained at intermediate pH values (about pH 6 to pH 8), whilst at more extreme pH values, for example below pH 5 or above pH 9, quite a soft handle is usually obtained.

The invention will be more clearly understood by reference to the following examples which are purely illustrative, and in which Examples 1, 2, 15 and 16 relate to the manufacture of the novel compounds and Examples 3 to 14 relate to the treatment of textile fibres therewith.

*Example 1*

43 parts of ethylene imine are added to 150 parts of methyl acrylate dissolved in 200 parts of methanol and the solution allowed to stand overnight. Methanol and excess methyl acrylate are distilled off under reduced pressure and finally the methyl ester of N:N-ethylene-β-alanine distills as a water-white liquid having the following physical properties: B. Pt. 84–85° C. at 30 mm.; density 1.006; E. W. 129; dissociation constant $K_B = 2.5 \times 10^{-8}$.

200 parts of this methyl ester are added to 30 parts of ethylene diamine in 400 parts of methanol and a small amount of alkaline catalyst. After standing 48 hours at room temperature, the methanol is removed at 40–50° C. under vacuum and the residue dissolved in boiling 2-butanone. On cooling crystals of

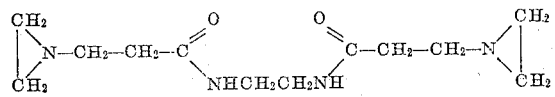

separate out. The product is very soluble in water, polymerising to a gel in aqueous solution, and added to aqueous solutions of polyethyleneimine causes irreversible gelation. On impregnating textile materials with aqueous solutions of this diamide, or salts thereof, and drying out, various permanent, desirable effects, such as increased resistance to creasing, decrease of tendency to shrink, and increased dyestuff fastness may be noted. On padding a solution of octadecylamine hydrochloride and the above product on to a fabric, drying at 75° C., and finally washing off the patterns well with soap and soda, it will be found that the fabric still contains attached octadecylamine, as evinced by the hydrophobic character of the washed fabric.

*Example 2*

The addition product from the reaction between ethylene imine and diethyl maleate is purified by distillation at 117–120° C. at 1 mm. pressure to give the diethyl ester of ethylene imino-succinic acid. 30 gms. of this ethylene imine derivative is condensed with 21 gms. of diethylene triamine (corresponding to a molecular ratio of 2:3 respectively) using 0.4 gm. of sodium ethoxide as a catalyst and after standing overnight an amber-coloured viscous liquid is obtained which dissolves readily in water to give a clear solution. If acid is added to a 15% solution of the viscous condensation product, irreversible gelation occurs on standing or warming indicating the presence of two or more ethylene imine groups per molecule of the product.

*Example 3*

A 10% aqueous solution of the product of Example 1 is adjusted to pH 9.5 using a small amount of sulphuric acid and fabric constructed from viscose rayon staple fibre is immersed in the solution at 20° C. for 15 seconds, squeezed to retain its own weight of the solution, and stretched out on a rigid frame to its original dry dimensions. The fabric is dried on the frame in a current of air at 50° C. for 15 minutes, when the pattern is quite dry, and it can be shown by chemical analysis that 85% of the ethylene imine groups have reacted. The treated fabric, indistinguishable from the untreated material in handle and appearance, is washed in 0.5% soap solution for 30 minutes at 60° C. alongside a similar untreated pattern and, after rinsing, the two patterns are allowed to dry in a relaxed state.

The following results are obtained for the shrinkage due to the washing treatment:

|  | Warp, percent | Weft, percent |
| --- | --- | --- |
| Untreated | 15 | 9 |
| Treated | 8 | 4 |

*Example 4*

A 10% aqueous solution of the product of Example 1 is adjusted to pH 7 using sulphuric acid, and a piece of the same fabric used in Example 3 is padded and dried in the same manner. The fabric in this case is quite stiff, and, furthermore, this rigidity is virtually unaffected after severe washing treatments. The resistance of the treated fabric to abrasion is appreciably greater than that of the untreated. The resistance to abrasion was measured on a laboratory friction machine and is expressed as the number of rubs to produce a hole. The average result in this case was: untreated 2,480 revolutions, treated 3,820 revolutions.

*Example 5*

A 10% aqueous solution of the product of Example 1 is adjusted to pH 4 using sulphuric acid (the solution should be kept quite cold whilst adding the acid in order to avoid premature polymerisation), and a pattern of the same fabric used in Example 3 is immersed in the solution, squeezed and dried in the same manner. The fabric is very closely similar to the fabric treated at pH 9, having approximately the same degree of shrinkage and giving the following results for degree of recovery from creasing after being creased in standard fashion using a kilogram weight for 1 minute:

|  | Untreated, degrees | Treated, degrees |
| --- | --- | --- |
| Angle of crease after recovering for 1 minute without restraint | 110 | 119 |

The degree of swelling of the fibres in water is reduced considerably. This is measured by centrifuging a treated and an untreated pattern under such conditions that the untreated pattern retains 100% by weight of water on the dried cellulose whilst the treated pattern only retains 72% by weight.

*Example 6*

A 15% aqeuous solution of the product of Example 2, the pH of which has been adjusted to 9, has a pattern of clean, de-sized linen fabric immersed therein, after standing 2 minutes at room temperature, the material is squeezed to remove surplus liquor and dried at 60–70° C. The pattern was washed in 0.5% soap solution for 30 minutes at 50° C., rinsed, dried and placed in an atmosphere of 65% relative humidity at 20° C. along with an untreated piece of the same fabric. After allowing the material to condition 2 days, it was found that the angle of recovery of the treated fabric was approximately 15° better than that of the untreated after the creasing treatment described in Example 5.

*Example 7*

A pattern cut from the fabric used in Example 3 is impregnated at room temperature with a 5% solution of the product of Example 2, the pH of which has been adjusted to pH 3 using sulphuric acid, and after squeezing to remove surplus liquid the pattern is stretched out to the original dimensions on a frame, dried at 30° C. in a stream of dry air and then heated for 2 minutes at 130° C. After washing along with a piece of untreated fabric in 0.5% soap at 60° C. for 30 minutes, drying in a relaxed state, and allowing the patterns to recover overnight, the percentage shrinkages are:

|           | Warp, percent | Weft, percent |
|-----------|---------------|---------------|
| Untreated | 15            | 9             |
| Treated   | 8             | 4             |

The treated fabric has a slightly firmer handle than before treatment.

*Example 8*

A hank of cotton yarn, dyed with 2% Chlorazol Fast Red KS [Colour Index (1924) No. 278], is immersed for 10 seconds in a 2% solution of the product of Example 1, the solution having a pH of 7, and the material is squeezed and dried at normal temperatures. On comparing the treated dyeing with the untreated for fastness to water and soap solution, it is found that whereas the untreated bleeds considerably in both cases, the treated yarn is quite unaffected by water, and shows only slight bleeding of the dyestuff into the liquor in hot soap solution. The shade of the dyeing is unaffected by the treatment.

*Example 9*

A suspension of 2 gms. of finely divided Caledon Blue RC [Colour Index (1924) No. 1114] in 100 gms. of water is divided into two equal parts, to one half is added 1 gm. of the product of Example 1 and a small amount of sulphuric acid to bring the pH to between 8 and 9. Patterns of scoured cotton fabric are placed in the two dispersions, squeezed and dried. On placing the impregnated fabrics in a 0.5% solution of soap at 50° C. it is found that the pattern treated in the dispersion with no additive has virtually all the pigment removed in a few minutes, whereas the dispersion containing the product of Example 1 is quite unaffected, and the solution may even be boiled without removing any of the pigment from the fibre.

*Example 10*

A pattern treated by the method of Example 7 is placed, along with a piece of untreated fabric, in a dyebath containing the acid dyestuff Orange II [Colour Index (1924) No. 151]. After dyeing has continued for about 1 hour at 100° C. the patterns are washed off in water, and it will be found that whereas the untreated fabric is very lightly stained, the treated fabric is quite heavily dyed.

*Example 11*

A piece of wool fabric is immersed for 5 minutes in a 10% solution of the product of Example 1 at pH 4, and at a temperature of 20° C., and finally squeezed and dried at 60° C. The material has quite a soft handle, and on milling alongside a pattern of untreated fabric in soap solution, it is found that the tendency to shrinkage is reduced. Thus, whilst the untreated has undergone a diminution in area of 24%, the treated fabric has shrunk by only 14%. The resistance to alkali is increased by treatment, and, on boiling treated and untreated fabric in a 1 gm. per litre solution of sodium hydroxide for 30 minutes, the pure wool loses 13% by weight whereas the wool modified as above loses only 8% by weight.

On dyeing the wool fabrics together in an acid dye liquor, it is found that the affinity of the treated wool is greatly enhanced by treatment, a property which is useful in the printing of woolen materials.

*Example 12*

20 gms. of the product of Example 2 is dissolved in 80 ccs. of methanol; to this solution at 15° C. and with vigorous stirring, 7 gms. of stearyl chloride is added whilst the pH of the solution is maintained at about 11 by the addition of sodium hydroxide. The resultant dispersion is readily diluted, and sufficient water is added to give a solution of approximately 5% strength. The pH of the solution is adjusted to 8, and a piece of cotton fabric immersed in the solution, squeezed, and dried at 50° C. was found to have a very soft, velvet-like handle and exhibit good water-repellency. These effects are permanent and virtually unaffected by washing in a solution of 0.5% soap and 0.5% sodium carbonate at 50° C. for 20 minutes, or extracting with boiling carbon tetrachloride for 30 minutes.

*Example 13*

A pattern of acetate filament fabric is impregnated with a 5% solution of polyacrylic acid and a second pattern of the same fabric is impregnated with a 5% solution of polyacrylic acid containing 0.4% of the product of Example 1. Both patterns are quite stiff after drying, but after washing in 0.5% soap and 0.5% sodium carbonate for ½-hour, the first pattern is as soft as before treatment, whilst the second pattern is still quite stiff, being only slightly less so than the same pattern before washing.

*Example 14*

An aqueous solution containing 20% polyethylene imine and 2.5% of the product of Example 1 has a small amount of hydrochloric acid added, and is heated to 80° C.; after a short time, depending on the amount of acid added, the solution sets to a rigid gel. After keeping at this temperature for 5 hours the gel is broken up, dried out, and ground to small particles. This product is quite insoluble, although it may swell slightly in polar solvents, such as methanol, acetone, and in particular water, and shows quite high affinity for anions in aqueous solution.

*Example 15*

150 gms. of methyl crotonate are added to 150 gms. of ethylene imine at room temperature. The mixture slowly becomes warm, reaching 42° C. in 20 minutes, the solution is cooled and allowed to stand for 2 days when reaction is virtually complete. The excess ethylene imine is distilled off at atmospheric pressure and the methyl ester of $\beta$-ethyleneimino-butyric acid is then distilled off in almost quantitative yield under reduced pressure. B. Pt. 93° C. at 45 mm. pressure. 143 gms. of the methyl ester of $\beta$-ethyleneimino-butyric acid is added to 73 gms. of triethylene tetramine followed by 5 cc. of a 5 N solution of sodium methoxide in methanol. The temperature rises slowly and after allowing to stand overnight the product is a soft yellow solid consisting principally of:

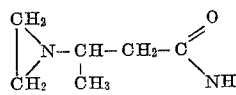 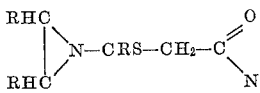 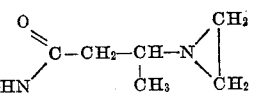 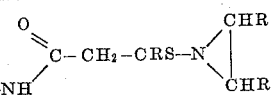

*Example 16*

28.6 gms. of the liquid formed by the addition

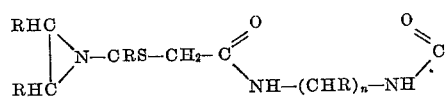

of ethylene imine to methyl crotonate (see Example 15) and 11.6 gms. of hexamethylene diamine are mixed and 0.5 gm. of sodium methoxide, dissolved in 3 cc. of methanol, are added. The solution evolves heat quite rapidly and after keeping at 40° C. for 30 mins., is allowed to stand overnight at room temperature. The product is a white crystalline mass, readily soluble is water and is closely analogous in appearance and properties to the product of Example 1.

I claim:

1. New derivatives of ethylene imine having the following general formula:

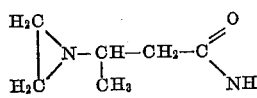 

where R represents a member selected from the group consisting of the hydrogen atom, the methyl radical, and the ethyl radical, S represents a member selected from the group consisting of the hydrogen atom, the methyl radical, the ethyl radical, the group of the formula —COOR, where R has the meaning given above, and amides derived from this latter group, and $n$ represents a positive integer from 2 to 6 inclusive.

2. New derivatives of ethylene imine having the following general formula:

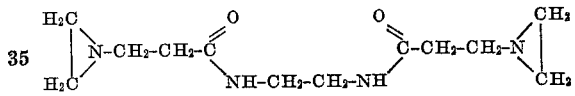

where R represents a member selected from the group consisting of the hydrogen atom, the methyl radical and the ethyl radical, S represents a member selected from the group consisting of the hydrogen atom, the methyl radical, the ethyl radical, the group of the formula —COOR, where R has the meaning given above, and amides derived from this latter group, and $n$ represents a positive integer from 0 to 3 inclusive.

3. The new derivative of ethylene imine selected from the group consisting of those having the following formula:

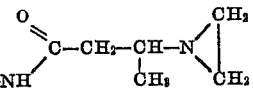

and polymers thereof.

4. The new derivative of ethylene imine selected from the group consisting of those having the following formula:

and polymers thereof.

References Cited in the file of this patent

UNITED STATES PATENTS

| Number | Name | Date |
|---|---|---|
| 2,272,489 | Ulrich | Feb. 10, 1942 |